United States Patent
Lipton

(10) Patent No.: US 10,229,522 B2
(45) Date of Patent: Mar. 12, 2019

(54) FIXED SIZE SCOPE OVERLAY FOR DIGITAL IMAGES

(71) Applicant: Apple Inc., Cupertino, CA (US)

(72) Inventor: Daniel I. Lipton, Belmont, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 15/274,650

(22) Filed: Sep. 23, 2016

(65) Prior Publication Data

US 2018/0089796 A1 Mar. 29, 2018

(51) Int. Cl.
*G06T 11/60* (2006.01)
*G06F 3/0484* (2013.01)
*G06T 7/60* (2017.01)

(52) U.S. Cl.
CPC .......... *G06T 11/60* (2013.01); *G06F 3/04845* (2013.01); *G06T 7/602* (2013.01); *G06T 2207/20092* (2013.01)

(58) Field of Classification Search
CPC ....... G06F 3/04845; G06T 3/40; G06T 11/60; G06T 2207/20082
See application file for complete search history.

(56) References Cited

U.S. PATENT DOCUMENTS

| | | | | |
|---|---|---|---|---|
| 8,918,737 | B2 * | 12/2014 | Takahashi | G06F 3/0481 715/800 |
| 2005/0268254 | A1 * | 12/2005 | Abramson | G01C 21/367 715/855 |
| 2011/0265041 | A1 * | 10/2011 | Ganetakos | A63F 13/533 3/533 |
| 2012/0069049 | A1 * | 3/2012 | Howe | G06T 7/0012 345/629 |
| 2012/0260204 | A1 * | 10/2012 | Audet | G06F 3/0481 715/769 |
| 2014/0225978 | A1 * | 8/2014 | Saban | H04N 1/622 348/14.07 |
| 2015/0310652 | A1 * | 10/2015 | Dobson | G02B 21/365 345/629 |
| 2016/0018951 | A1 * | 1/2016 | Grabar | G06F 3/0481 715/765 |
| 2016/0217591 | A1 * | 7/2016 | Krupnik | G06T 7/602 |
| 2016/0378336 | A1 * | 12/2016 | Katsuyama | G06F 3/04883 345/472 |

* cited by examiner

*Primary Examiner* — Diane M Wills
(74) *Attorney, Agent, or Firm* — Sterne, Kessler, Goldstein & Fox P.L.L.C.

(57) ABSTRACT

Systems and methods are disclosed for processing a digital image. In some embodiments, a digital image may be output to a display. A scope overlay may be provided that includes a cursor window, a viewing window having a fixed size relative to the display, and a target source size. The viewing window may be calibrated according to the target source size to generate an image scale factor. In some embodiments, the calibrating may include correlating a section of the viewing window to the target source size, and calculating a ratio of the target source size to a display size of the section of the viewing window to generate the image scale factor. A portion of the digital image may then be displayed within the viewing window of the scope overlay, and the portion of the digital image may be scaled according to the image scale factor.

20 Claims, 7 Drawing Sheets

FIXED SIZE SCOPE OVERLAY FOR DIGITAL IMAGES

BACKGROUND

Field

Embodiments described herein are generally related to processing digital images.

Background

Analysis of digital images often involves identifying and annotating specific parts of an image. For example, a user researching a new bridge structure may analyze various traffic images to identify the number of large vehicles ordinarily traveling on a particular route. A common workflow to accomplish this task is to load the image into an image viewer application, zoom in and out to appropriate scale, and pan the image to identify and mark each large vehicle encountered.

For large, high resolution images, this workflow can take significant time and concentration. When zoomed in, the user may lose a sense of location within the image, and movements may further cause momentary disorientation. Duplication of effort may be required to ensure that every portion of the digital image has been analyzed, leading to inefficient analysis and higher overall task costs.

SUMMARY

Provided herein are system, apparatus, device, module, component, method and/or computer program product embodiments, and/or combinations and sub-combinations thereof, for processing a digital image. In some embodiments, a digital image may be output to a display. A scope overlay may be provided that includes a cursor window, a viewing window having a fixed size relative to the display, and a target source size. The viewing window may be calibrated according to the target source size to generate an image scale factor. In some embodiments, the calibrating may include correlating a section of the viewing window to the target source size, and calculating a ratio of the target source size to a display size of the section of the viewing window to generate the image scale factor. A portion of the digital image may then be displayed within the viewing window of the scope overlay, and the portion of the digital image may be scaled according to the image scale factor. In some embodiments, the portion of the digital image may correspond to the position of the cursor window on the display.

In some embodiments, the target source size may be represented by a physical unit of measure, and a conversion factor associated with the digital image may be received. The target source size of the scope overlay may then be converted to pixels based on the conversion factor. In some embodiments, the viewing window may also be recalibrated in response to a change in the target source size.

In some embodiments, movement of the cursor window may be detected, and the portion of the digital image displayed within the viewing window may be updated in response to detecting the movement. The displayed digital image may also be annotated at the position of the cursor window in response to user input.

In some embodiments, the target source size may include a target width and a target height, and a measurement guide may be displayed superimposed within the viewing window of the scope overlay. The measurement guide may correspond to the target width and the target height. In a further embodiment, the target source size may include a target depth, and the measurement guide within the viewing window of the scope overlay may further correspond to the target depth. In this case, the measurement guide may be oriented according to a received perspective angle corresponding to the digital image.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example Fixed Size Scope Overlay

Users are often tasked with analyzing digital images to identify and annotate various parts or objects within the image. For example, a user may desire to identify parks within a geographic region that are smaller than 625 square yards. Current image analysis tools commonly require the user to load a digital image of the geographic region into an interface, zoom the image to an appropriate scale for which the parks can be seen, and pan the image to identify each park. This workflow is inefficient, requiring the user to carefully navigate the image, remembering the current location being viewed and the portions that have already been analyzed. Further, when a park is encountered, the user needs a way to determine whether the park is smaller than 625 square yards. This may require the user to pan and zoom to find a map scale, manually convert the value to image pixels or inches, and use a digital or physical ruler to measure the park dimensions. Thus, the user would benefit from a solution that allows for quick identification and annotation of digital images without requiring an inefficient pan and zoom workflow.

Figure 1:
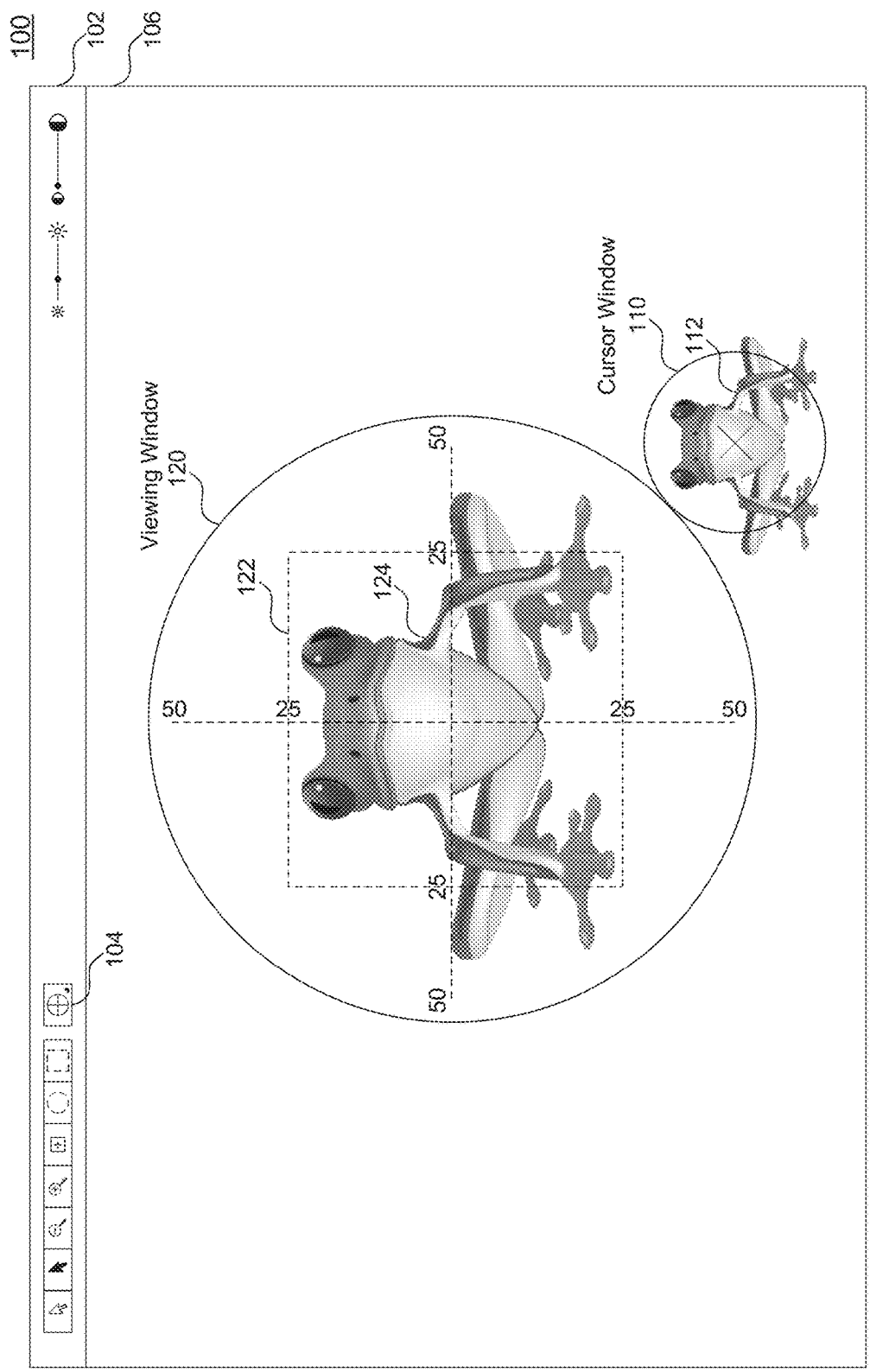
FIG. 1 is a diagram illustrating an example user interface providing a scope overlay displayed over a digital image, according to some embodiments.

FIG. 1 is a diagram illustrating an example user interface 100 providing a scope overlay displayed over a digital image, according to some embodiments. A digital image in this context may refer to any type of image or video frame capable of being stored in an electronic memory or computer-readable medium, such as those described with respect to FIG. 7. Example digital image types may include, but are not limited to, JPEG, GIF, TIFF, PNG, and BMP. In some embodiments, user interface 100 may be output to a display, such as but not limited to, a computer monitor or television. The display may be part of a display device, such as display device 430 of FIG. 4, which is described further below. The display may have a corresponding native display size or display resolution, for example 1920×1080 pixels. In some embodiments, the display size may be measured in a unit other than pixels, for example for vector displays. However, display sizes and image sizes are primarily denoted in pixels throughout the specification by way of example.

In some embodiments, user interface 100 includes tool pane 102 and viewing pane 106. Tool pane 102 may include various image editing and viewing tools, such as image selection and zoom tools. In some embodiments, tool pane 102 also includes a scope overlay tool selector 104, which may be used to activate and adjust various settings of a scope overlay, as will be described further below. In some embodiments, viewing pane 106 displays a digital image for processing and analysis. As illustrated in user interface 100, viewing pane 106 may display a digital image including frog 112. The digital image may have an associated native image size, for example 800×600 pixels. In some embodiments, the digital image may be zoomed to an arbitrary scale (e.g., 200%), and thus each native image pixel may span multiple display pixels, or vice versa.

In some embodiments, a scope overlay is activated via scope overlay tool selector 104. The scope overlay may include a cursor window 110 and a viewing window 120. Cursor window 110 may be moved in response to input from a user, for example moving a mouse cursor across the image. In various embodiments, a window, such as cursor window 110 and viewing window 120, may refer to any visual area that encompasses part of a user interface, such as user interface 100. For example, a window may be represented by an area of user interface 100 of a particular shape and size, or by a visual mark (e.g., a visual icon) within user interface 100. In some embodiments, viewing window 120 may move with cursor window 110, and viewing window 120 may have a fixed size relative to the display. In other words, if the zoom level of the digital image is changed, the size of viewing window 120 on the display does not change.

In some embodiments, the viewing window 120 of the scope overlay may be calibrated to display a portion of the digital image according to a target source size. The target source size may denote a size corresponding to the digital image, independent of the display size or display resolution, that should be displayed within viewing window 120. In some embodiments, the target source size may include a target height and a target width. The target source size may be used to determine an image scale factor for viewing window 120, as will be described further below. A portion of the digital image may then be displayed in viewing window 120 at a scale corresponding to the determined image scale factor. This enables a user to view portions of the digital image at a desired scale independent of the zoom level of the digital image within viewing pane 106. As the zoom level of the digital image changes, the scale of the image displayed within viewing window 120 does not change.

For example, a user may desire to determine whether frog 112 is smaller than 50 pixels in height. This would normally require the user to increase the zoom level of the digital image in order to apply some form of digital measurement tool, if available. However, the scope overlay enables a user to efficiently determine the height of frog 112 by displaying a portion of the digital image at an appropriate scale without requiring the user to change the zoom level of the digital image. In the example illustrated in FIG. 1, frog 112 is scaled for display in viewing window 120 as frog 124. In some embodiments, viewing window 120 may further display a measurement guide 122 superimposed over the displayed portion of the digital image (e.g., frog 124). Measurement guide 122 may correspond to the target source size. In this case, each small box of measurement guide 122 indicates 25 pixels in height and width. In some embodiments, the target source size may specify the height and width of each box, for example 25 pixels. In other embodiments, the target source size may also be specified to indicate the height and width of the larger box (e.g., 50 pixels) or the total height and width of measurement guide 122 (e.g., 100 pixels). For ease of discussion and example, the target source size is described throughout the specification to refer to the height and width of each small box within measurement guide 122 (e.g., 25 pixels).

In some embodiments, viewing window 120 may be calibrated by first defining a section of the viewing window to correlate to the target source size. In this case, the section of the viewing window may be defined as a 25 pixel by 25 pixel box as shown by measurement guide 122. However, since viewing window 120 has a fixed size relative to the display, the 25 pixel by 25 pixel box may have a display size larger than 25 pixels in height and width. For example, the 25 pixel by 25 pixel box within viewing window 120 may measure 150 pixels by 150 pixels of the display. This ratio the display size of the correlated section of viewing window 120 to the target source size may be used as an image scale factor within viewing window 120. In this example, the ratio would be 150 pixels to 25 pixels, or 6:1. Thus, the image scale factor is 6, and the portion of the digital image displayed within viewing window 120 may be scaled to 6 times its native image size.

This image scale factor does not change as the digital image is zoomed to different levels, but only changes as the target source size changes. For example, if the target source size were changed from 25 pixels in size to 50 pixels in size, the image scale factor would be cut in half to 3. Here, the portion of the digital image displayed within viewing window 120 would appear half as large. In some embodiments, the units of measurement guide 122 may also change such that each small box indicates 50 pixels by 50 pixels. In this manner, changes to the target source size enable efficient measurements of the digital image based on the needs of a particular user.

In some embodiments, the target source size may be defaulted to a particular value or included or associated with the digital image. For example, user interface 100 may read in a default target source size when loading the digital image. This may be useful for delegating a task to identify objects in an image of a particular size. In some embodiments, the user may also or alternatively be able to select a target source size. This may be done via scope overlay tool selector 104 or through other means. In some embodiments, the user may specify a custom value for the target source size, or preset selections may be available (e.g., 25 pixels, 50 pixels, 100 pixels). In some embodiments, the user may select one value that indicates both the target height and target width of the target source size. The user may also select different values for the target height and target width of the target source size.

When a change in the target source size is detected, according to some embodiments, viewing window 120 may be recalibrated to display a portion of the digital image at the correct image scale. As described above, if the target source size changes from 25 pixels to 50 pixels, a new image scale factor may be determined. A portion of the digital image at the location of cursor window 110 may then be scaled according to the new image scale factor for display within viewing window 120.

In user interface 100 of FIG. 1, cursor window 110 is centered on frog 112. Thus, frog 124 is displayed centered within viewing window 120. In some embodiments, the portion of the digital image displayed within viewing window 120 may be updated as cursor window 110 moves across the digital image, for example in response to a user moving a mouse. This workflow allows a user to quickly move to different objects or portions within the digital image without panning and zooming throughout the image.

In some embodiments, viewing window 120 of the scope overlay may have a default position in relation to cursor window 110, for example above and left of cursor window 110. However, viewing window 120 may be configured to remain within view on the display regardless of the position of cursor window 110. For example, if cursor window 110 is moved to the leftmost portion of viewing pane 106, viewing window 120 may move to the right to remain visible on the display. In some embodiments, this movement of viewing window 120 may be accomplished through a rolling animation, such that viewing window 120 rolls around cursor window 110 to remain in view. When cursor window 110 is moved back to the right, viewing window 120 may roll back to its default position. The rolling animation is useful to maintain an efficient workflow, as the sudden movement of viewing window 120 may temporarily disorient a user.

In some embodiments, the target source size may be denoted in a unit other than pixels. For example, the target source size may be denoted by a physical unit of measure, such as feet, yards, meters, or miles. As described previously, this may be useful for a user tasked with identifying parks on a map that are smaller than 625 square yards. In this case, the user may set the target source size to 25 yards so that a park's height and/or width will fit within one of the boxes of measurement guide 122.

In order to calibrate viewing window 120 based on this target source size, a conversion factor associated with the digital image may be determined. In some embodiments, this conversion factor may be included or associated with the digital image and read by user interface 100, or the conversion factor may be specified by a user. In some embodiments, the conversion factor may indicate a conversion from the specified unit of measure to native image units, e.g., yards to pixels. Viewing window 120 may then be calibrated as described above using the converted native image units. In some embodiments, measurement guide 122 may display indicators in the unit of measure specified by the target source size. For example, measurement guide 122 illustrates dashed lines and numeric indicators corresponding to the target source size.

In some embodiments, a user may be able to annotate the digital image at the location of cursor window 110 while using the scope overlay. In some embodiments, the annotation may include creating a pin or mark at the center of cursor window 110 or creating a boundary around a portion of the digital image. A user may also be able to select a color and style of the annotation, for example a red dashed line boundary. In some embodiments, annotations made while using the scope overlay may persist on the digital image after ceasing use of the scope. This workflow enables a user to mark identified objects and portions of the digital image without needing to switch tools within interface 100. In some embodiments, the color and style of the scope overlay may also be customized, for example by a user.

In some embodiments, measurement guide 122 may be adapted to fit particular objects within the digital image without changing the target source size. For example, if a user desired to measure the exact width of frog 124, the user may drag the boxes of measurement guide 122 to be wider. The pixel value indicators of measurement guide 122 may update in response to this change so that the user can quickly view and determine the total width of frog 124. In some embodiments, measurement guide 122 may be adapted automatically to fit particular objects as specified through programmatic parameters.

Figure 2B:
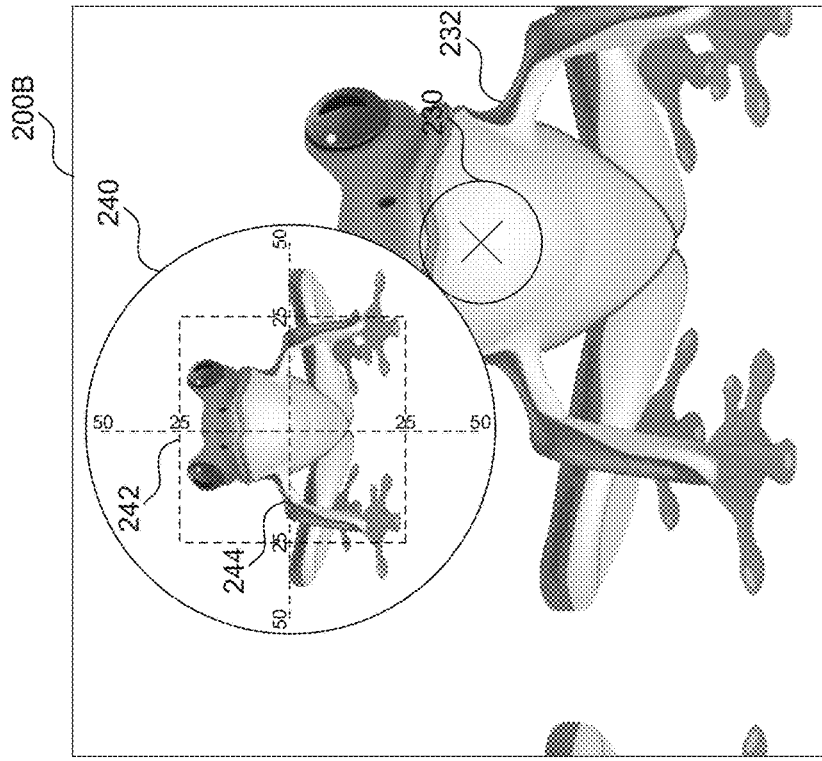
FIGS. 2A and 2B are diagrams illustrating an example scope overlay displayed over a digital image, according to some embodiments.
Figure 2A:
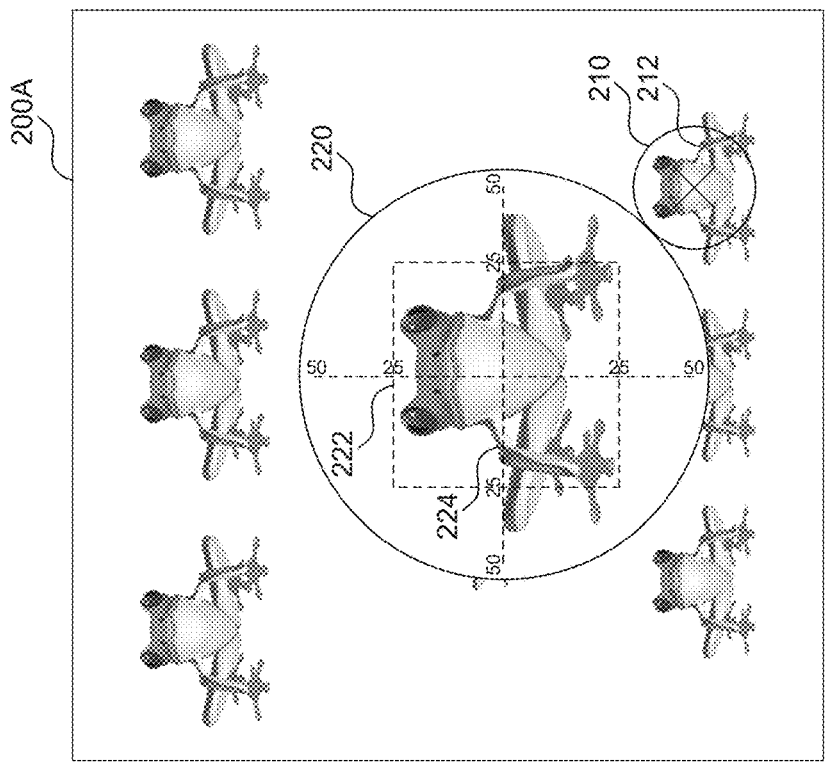

FIGS. 2A and 2B are diagrams illustrating an example scope overlay displayed over a digital image, according to some embodiments. Windows 200A and 200B may represent a viewing window of a user interface, such as viewing window 106 of FIG. 1. Windows 200A and 200B display the same digital image at different zoom levels. The digital image includes multiple frogs of different sizes, such as frog 212.

FIG. 2A illustrates an example scope overlay including cursor window 210 and viewing window 220 displayed over the digital image. As described with respect to FIG. 1, the target source size is set to 25 pixels, as shown by measurement guide 222. Viewing window 220 may be calibrated to display a portion of the digital image so that the image is scaled to match the target source size. When cursor window 210 is centered over frog 212 in the digital image, viewing window 220 displays frog 212 as frog 224. In this case, the digital image is zoomed to a level such that frog 224 appears larger than frog 212. This enables a user to easily see that frog 212 is smaller than 50 pixels in height while viewing the entire digital image in window 200A. The user may then move cursor window 210 to other frogs of the digital image to determine their size without zooming and panning the digital image.

In FIG. 2B, the digital image is zoomed to a greater level, making it difficult to determine the entire size of frog 232 without panning the digital image or adjusting the image zoom. Cursor window 230 of the scope overlay is centered on frog 232, and frog 232 is displayed in viewing window 240 as frog 242. The target source size is similarly set to 25 pixels, as indicated by measurement guide 244. In this case, since the scope overlay is fixed in size relative to the display and the target source size is still set to 25 pixels, frog 244 appears smaller than frog 232. In effect, this enables a user to efficiently determine the size of objects within the digital image regardless of the zoom level of the digital image in windows 200A and 200B. A user can simply move cursor window 210 or 230 over different objects in the image to determine their size using the scope overlay.

Figure 3:
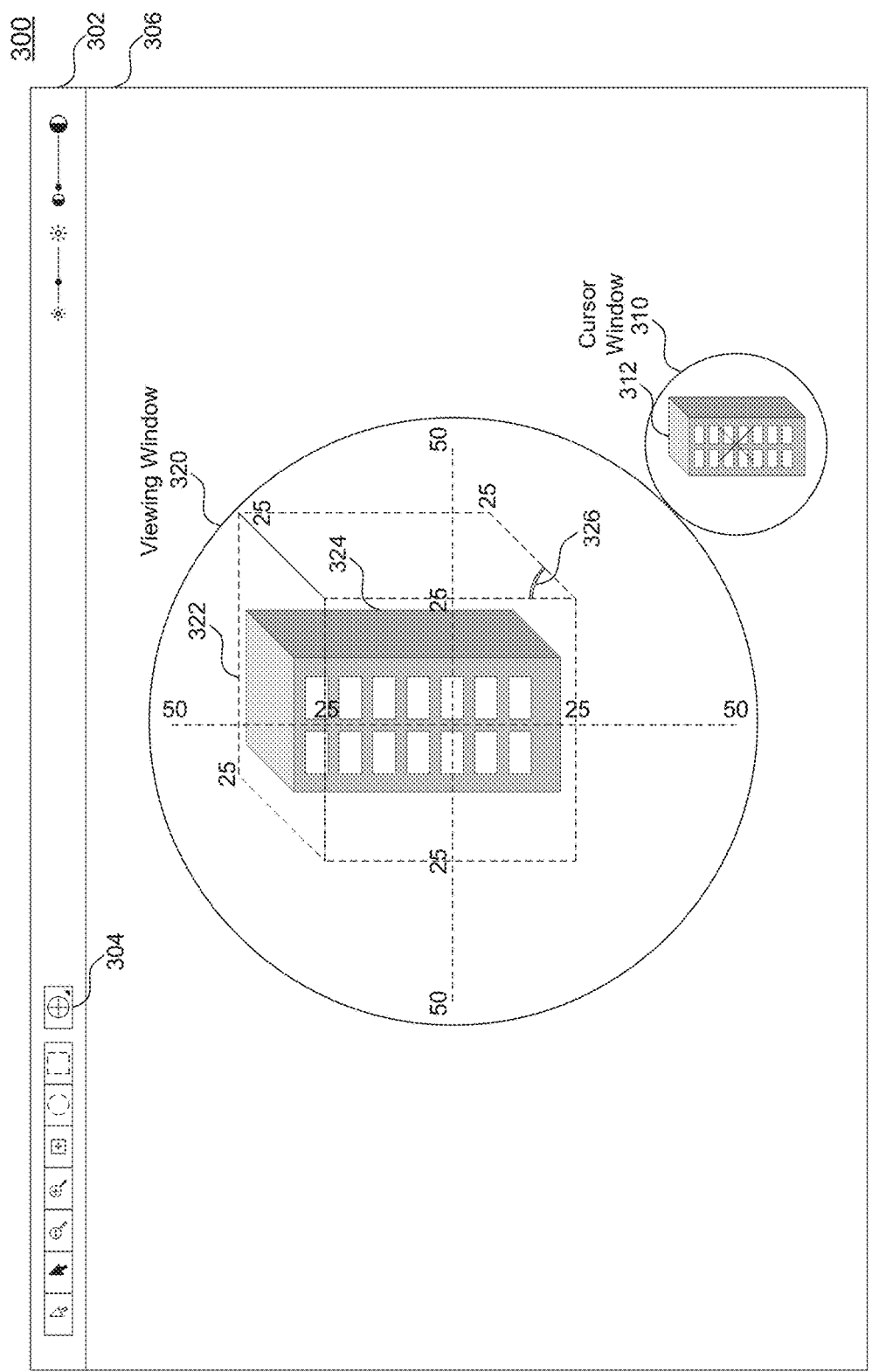
FIG. 3 is a diagram illustrating an example user interface providing a three-dimensional scope overlay displayed over a digital image, according to some embodiments.

FIG. 3 is a diagram illustrating an example user interface 300 providing a three-dimensional (3D) scope overlay displayed over a digital image, according to some embodiments. In some embodiments, interface 300 may include tools pane 302 and viewing pane 306. Tool pane 302 may include various image editing and viewing tools, as well as a scope overlay tool selector 304, as described with respect to tool pane 102 of FIG. 1. In some embodiments, viewing window 306 may display a digital image for processing and analysis. As illustrated in user interface 300, viewing pane 306 may display a digital image including one or more 3D objects, such as building 312.

In some embodiments, a scope overlay may be activated via scope overlay tool selector 304. The scope overlay may include a cursor window 310 and a viewing window 320, similar to cursor window 110 and viewing window 120 of FIG. 1, respectively. As described with respect to FIG. 1, viewing window 320 may be calibrated according to a target source size, which is illustrated as 25 pixels. In addition to a target height and target width included in the target source size, in some embodiments, the target source size may also include a target depth. Viewing window 320 may display a measurement guide 322, similar to measurement guide 122 of FIG. 1. However, measurement guide 322 may correspond to the target depth in addition to the target height and width. The target height, width, and depth of the target source size are each illustrated in FIG. 3 as 25 pixels, but in some embodiments the target height, width, and depth may be set to different values.

Depending on the perspective that an image is taken, a 3D object within the image may appear differently. For example, the digital image displayed in viewing pane 306 is taken from a perspective such that the depth of building 312 is seen at approximately a 45 degree angle from the front of the building. This angle may be referred to as a perspective angle of the digital image. In some embodiments, this perspective angle may be included or associated with the digital image and read by user interface 300 when the image is loaded. Alternatively, the perspective angle may be determined automatically through analysis of the digital image. As cursor window 310 is centered over building 312 in the digital image, viewing window 320 may display building 312 as building 324 scaled according to the target source size. In some embodiments, measurement guide 322 may be oriented according to the perspective angle corresponding to the digital image. For example, as illustrated in FIG. 3, the indicator of measurement guide 322 corresponding to the target depth may be displayed according to perspective angle 326. This allows accurate depth measurements to be determined by matching measurement guide 322 to the perspective of the digital image.

In some embodiments, there may be more than one perspective angle corresponding to the digital image. This may occur when processing an image with perspective distortion, such as an image taken using a wide angle lens. In this case, the perspective angle may differ for different portions of the digital image. In some embodiments, these multiple perspective angles may be included or associated with the digital image and read by interface 300. The multiple perspective angles may also include locations within the digital image for which they apply. In some embodiments, the multiple perspective angles may be determined automatically through analysis of the digital image. Further, measurement guide 322 may be adapted and reoriented to match the appropriate perspective angle as cursor window 310 is moved across the digital image.

Figure 4:
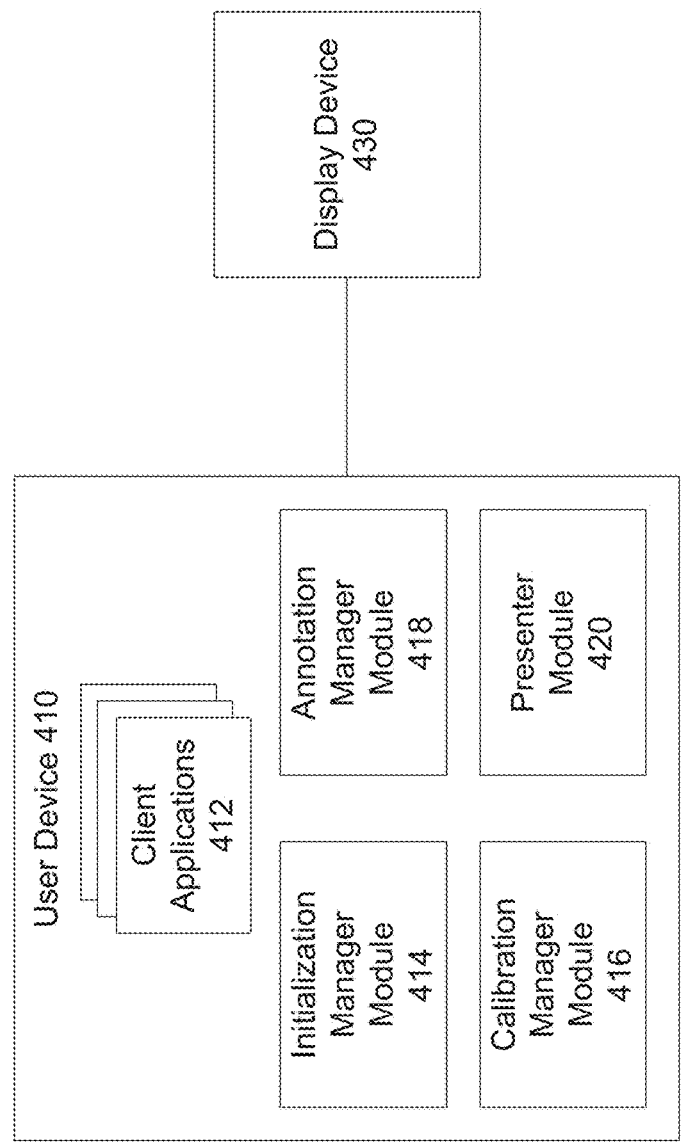
FIG. 4 is a diagram illustrating an example system for processing digital images, according to some embodiments.

FIG. 4 is a diagram illustrating an example system 400 for processing digital images, according to some embodiments. User device 410 may be any computing device, such as a laptop computer, desktop computer, netbook computer, server computer, handheld device (e.g., dumb or smart phone, tablet, etc.), wearable device (e.g., eyeglasses, wrist watch, etc.), virtual reality (VR) or argument reality (AR) device (e.g., a VR/AR headset), in-vehicle infotainment system, gaming console, television set, media center, set-top box, global positioning system (GPS), printer, etc. Example computing devices are further described with respect to FIG. 7. User device 410 may include client applications 412, an initialization manager module 414, a calibration manager module 416, an annotation manager module 418, and a presenter module 420. It is to be appreciated that user device 400 may include other components in addition to or in place of the components illustrated in FIG. 4 without departing from the scope and spirit of this disclosure. In some embodiments, User device 410 may be communicatively coupled to display device 430. Alternatively, display device 430 may be a component of user device 410. Display device 430 may be any electronic device capable of displaying a digital image, such as those computing devices described with respect to FIG. 7. In some embodiments, user device 410 may be communicatively coupled to display device 430 via a network, such as for example, a local area network, a wide-area network (e.g., the Internet), or any combination thereof.

Client applications 412 may be any software application executable on user device 410 in which the above described image processing techniques may be implemented. In some embodiments, client applications 412 may include, for example, an image viewing and/or image editing application in which the fixed size scope overlay described with respect to FIGS. 1-3 may be used.

Initialization manager module 414 may load and initialize a digital image within a client application. In some embodiments, initialization manager module may read parameters associated with the digital image, as described with respect to FIGS. 1-3, for example a default target source size. Initialization manager module 414 may pass these parameters to other components within client device 400 as appropriate.

Calibration manager module 416 may manage and perform calibration of a viewing window of a scope overlay, such as viewing window 120 as described with respect to FIG. 1. In some embodiments, calibration manager module 416 may receive information from initialization manager module 414 prior to performing calibration, such as a default target source size.

Annotation manager module 418 may perform annotation of a digital image, as described with respect to FIG. 1. In some embodiments, annotation manager module 418 may perform annotation in response to received user input. Annotation manager module 418 may also manage annotation settings, such as a color and style of annotation.

Presenter module 420 may output a digital image to a display device as described with respect to FIG. 1, such as display device 430. In some embodiments, presenter module 420 may render a graphical user interface (GUI), such as user interface 100 of FIG. 1, and output the digital image within the rendered GUI. Presenter module 420 may also output a fixed size scope overlay to the display device, as described with respect to FIGS. 1-3. In some embodiments, presenter module 420 may display a measurement guide within the scope overlay, such as measurement guides 122, 222, 242, and 322. Presenter module 420 may also manage and orient the measurement guide according to a perspective angle, as described with respect to FIG. 3. In some embodiments, presenter module 420 may further perform GUI animations, as described with respect to FIG. 1.

Example Method

Figure 5:
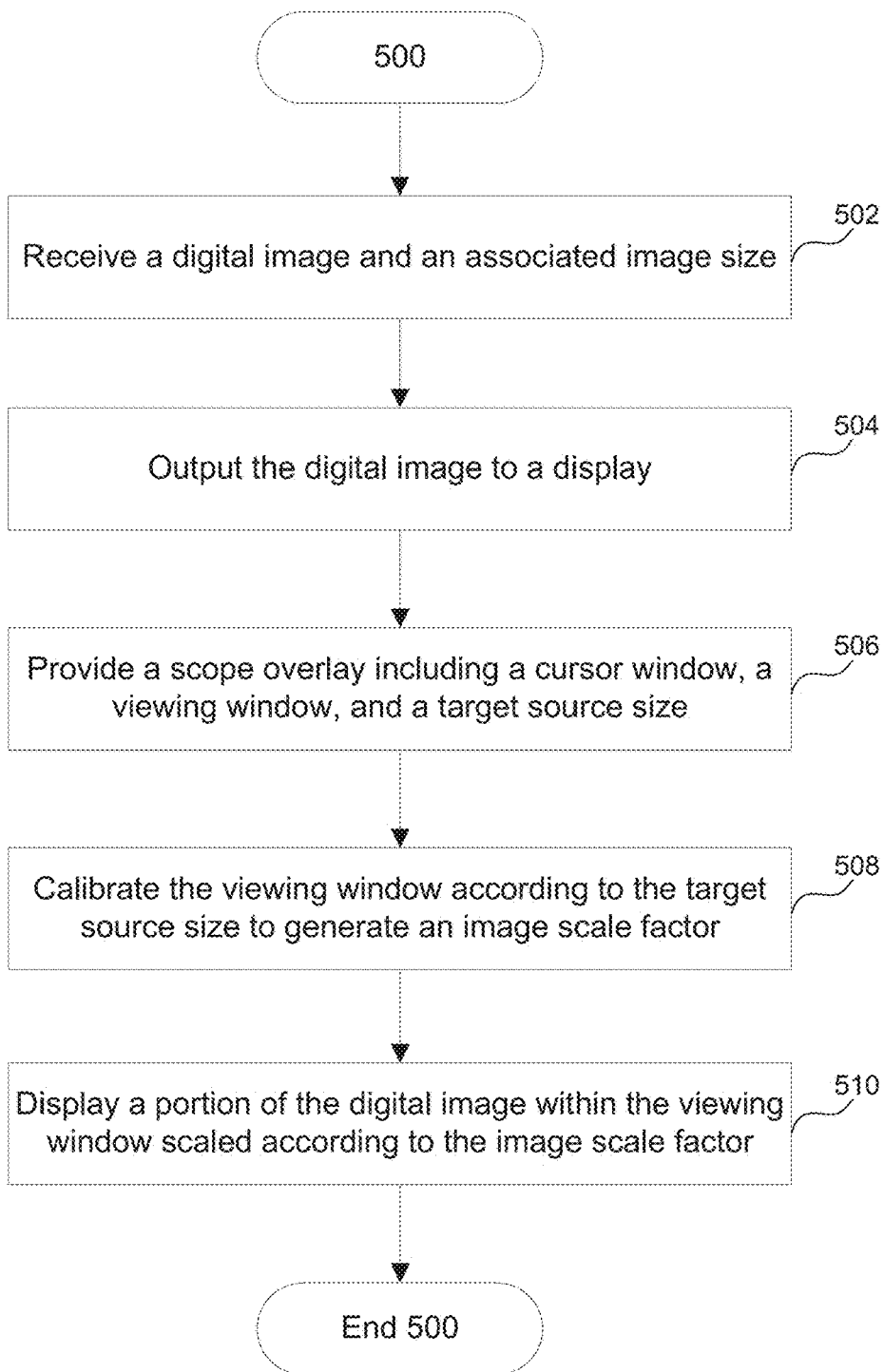
FIG. 5 is an example method for processing a digital image, according to some embodiments.

FIG. 5 is an example method 500 for processing a digital image, according to some embodiments. It is to be appreciated that not all steps may be needed to perform the disclosure provided herein. Further, some of the steps may be performed simultaneously, or in a different order than shown in FIG. 5, as will be understood by a person of ordinary skill in the art. In some embodiments, method 500 may be performed by initialization manager module 414, calibration manager module 416, and presenter module 420 of FIG. 4.

Method 500 begins at stage 502 by receiving a digital image and an associated image size. In some embodiments, the image size may be denoted in pixels, inches, and/or another unit that can represent the native image size or resolution. At stage 504, the digital image may be output to a display, such as display device 430 of FIG. 4. In some embodiments, stage 504 may be performed by a presenter module, such as presenter module 420 of FIG. 4. The digital image may refer to any type of image or video frame capable of being stored in an electronic memory or computer-readable medium, such as those described with respect to FIG. 7. Example digital image types may include, but are not limited to, JPEG, GIF, TIFF, PNG, and BMP. The display may have a corresponding native display size or display resolution, for example 1920×1080 pixels, and the digital image may have an associated native image size, for example 800×600 pixels.

At stage 506, a scope overlay may be provided by the presenter module. In some embodiments, the scope overlay may include a cursor window, a viewing window, and a target source size. The cursor window may be moved in response to input from a user, for example moving a mouse cursor across the image. In some embodiments, the viewing window may move with the cursor window, and the viewing window has a fixed size relative to the display. In other words, if the zoom level of the digital image is changed, the size of the viewing window on the display does not change. In some embodiments, the target source size may denote a size corresponding to the digital image, independent of the display size or display resolution, that should be displayed within the viewing window. The target source size may include a target height and a target width.

In some embodiments, the target source size may be defaulted to a particular value or included or associated with the digital image. In the case that the target source size is included or associated with the digital image, an initialization manager module, such as initialization manager module 414 of FIG. 4, may read and process the target source size. The user may also or alternatively be able to select a target source size. In some embodiments, the user may specify a custom value for the target source size, or preset selections may be available (e.g., 25 pixels, 50 pixels, 100 pixels). In some embodiments, the user may select one value that indicates both the target height and target width of the target source size. The user may also select different values for the target height and target width of the target source size. In some embodiments, user input and selections may be obtained via a GUI, such as user interface 100 of FIG. 1. The presenter module may process the received user input.

At stage 508, the viewing window may be calibrated according to the target source size to generate an image scale factor. In some embodiments, stage 508 may be performed by a calibration manager module, such as calibration manager module 416 of FIG. 4. The image scale factor may be generated as described below with respect to FIG. 6 and indicates a factor for which a portion of the digital image is scaled for display within the viewing window. For example, if the image scale factor is 3, the portion of the digital image may be scaled to three times its original size for display within viewing window 120.

Finally, at stage 510, a portion of the digital image may be displayed within the viewing window of the scope overlay according to the image scale factor. This enables a user to view portions of the digital image at a desired scale independent of the zoom level of the digital image within viewing pane 106. As the zoom level of the digital image changes, the scale of the image displayed within viewing window 120 does not change. In some embodiments, stage 510 may be performed by the presenter module.

Figure 6:
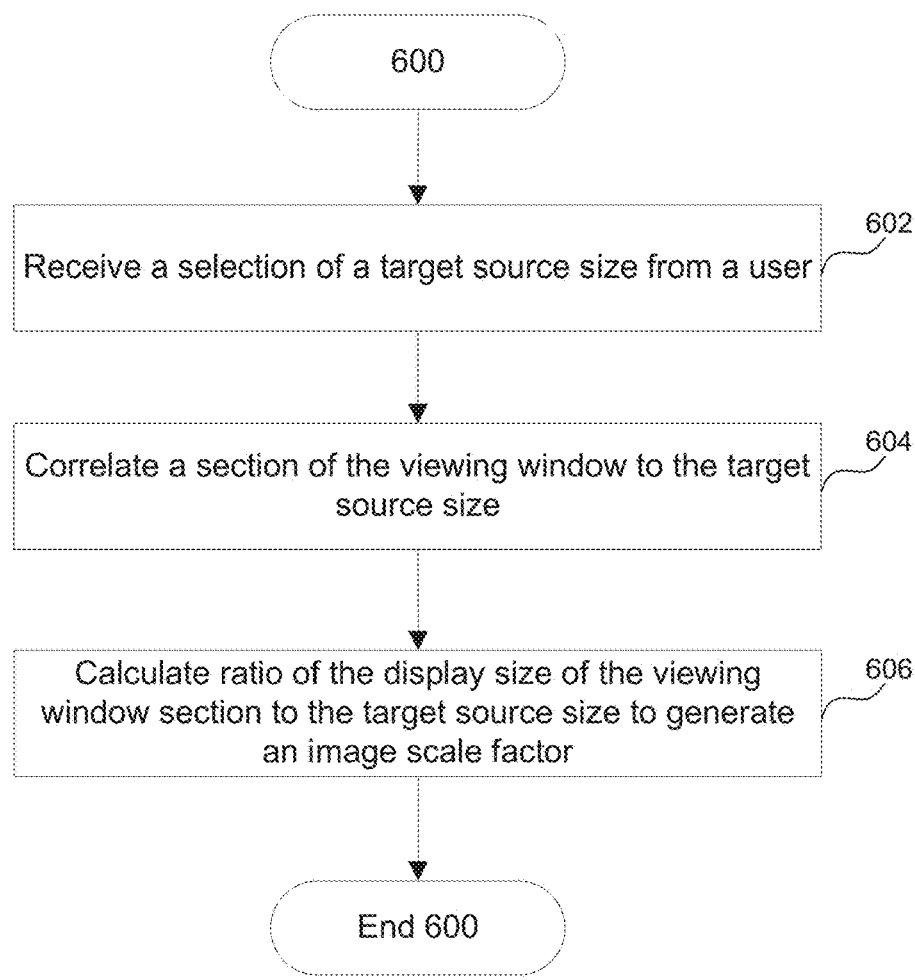
FIG. 6 is an example method for determining an image scale factor based on a particular target source size, according to some embodiments.

FIG. 6 is an example method 600 for determining an image scale factor based on a particular target source size, according to some embodiments. It is to be appreciated that not all steps may be needed to perform the disclosure provided herein. Further, some of the steps may be performed simultaneously, or in a different order than shown in FIG. 6, as will be understood by a person of ordinary skill in the art. In some embodiments, method 600 may be performed by calibration manager module 416 and presenter module 420 of FIG. 4.

Method 600 begins at stage 602 by receiving a selection of a target source size from a user. In some embodiments, a presenter module, such as presenter module 420 of FIG. 4, may receive and process the target source size selection. At stage 604, a section of the viewing window of the scope overlay may be correlated to the selected target source size. For example, a 25 pixel by 25 pixel box as shown in measurement guide 122 of FIG. 1 may be correlated to a selected target source size of 25 pixels. Since the viewing window has a fixed size relative to the display, the 25 pixel by 25 pixel box may have a display size larger than 25 pixels in height and width. For example, the 25 pixel by 25 pixel box within the viewing window may measure 150 pixels by 150 pixels of the display. In some embodiments, stage 604 may be performed by a calibration manager module, such as calibration manager module 416 of FIG. 4.

At stage 606, the ratio of the display size of the viewing window section to the target source size may be calculated to generate an image scale factor. In some embodiments, stage 506 may also be performed by the calibration manager module. In the example above, the ratio of the display size of the viewing window section to the target source size is 150 pixels to 25 pixels, or 6:1. Thus, the generated image scale factor is 6, and the portion of the digital image displayed within the viewing window may be scaled to 6 times its native image size. While method 600 receives a selection of a target source size from a user at stage 602, stages 604 and 606 may also be executed based on a default or otherwise determined target source size.

Example Computer System

Figure 7:
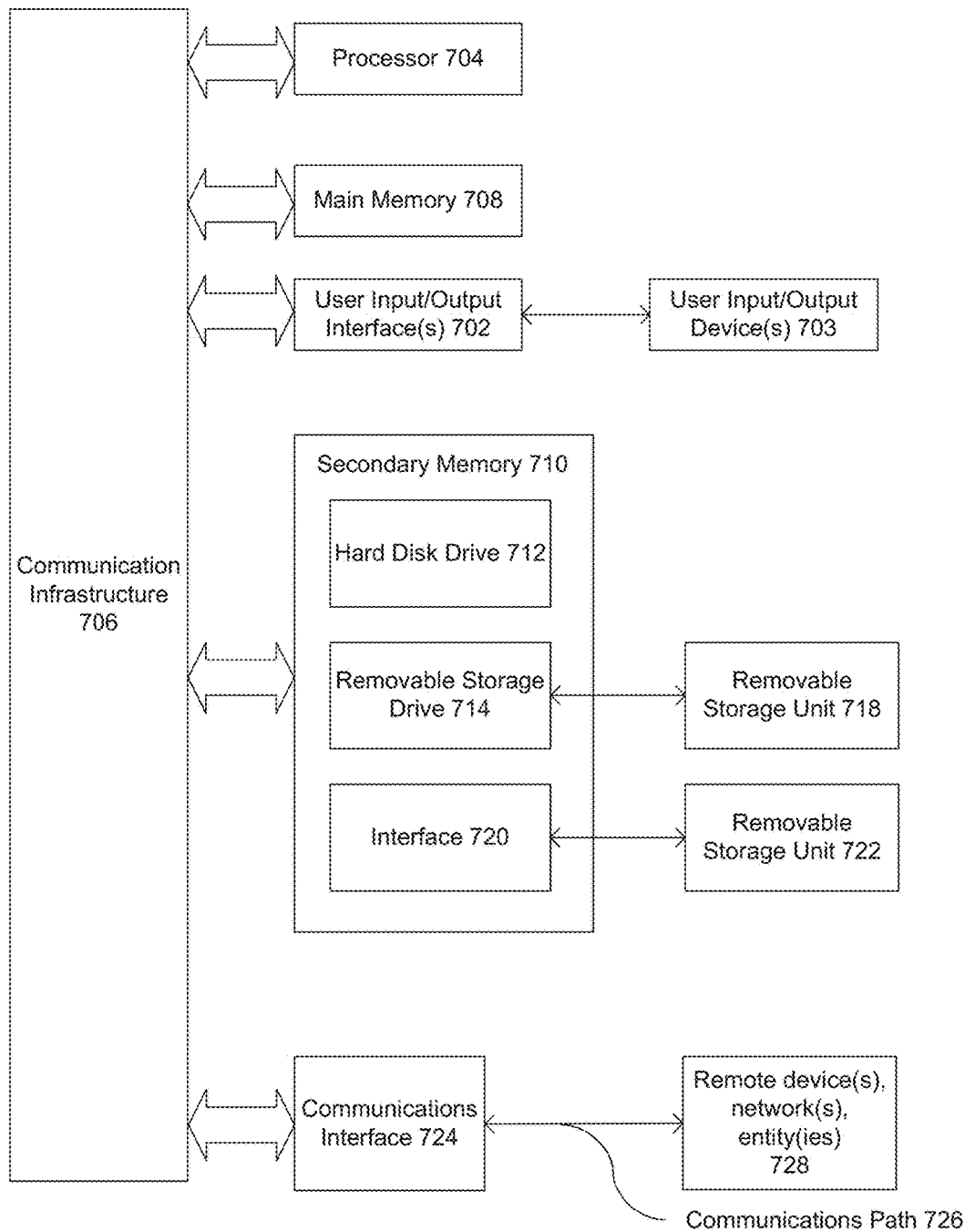
FIG. 7 is a diagram illustrating an example computing device, according to some embodiments.

FIG. 7 is an example computing system useful for implementing various embodiments. Various embodiments can be implemented, for example, using one or more well-known computer systems, such as computer system 700. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 may be connected to a communication infrastructure or bus 706.

One or more processors 704 may each be a graphics processing unit (GPU). In some embodiments, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to an exemplary embodiment, secondary memory 710 may include other means, instrumentalities, or other approaches for allowing computer programs and/or other instructions and/or data to be accessed by computer system 700. Such means, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In some embodiments, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of this disclosure as contemplated by the inventor(s), and thus, are not intended to limit this disclosure or the appended claims in any way.

While this disclosure has been described herein with reference to exemplary embodiments for exemplary fields and applications, it should be understood that this disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of this disclosure should not be limited by any of the above-described exemplary embodiments, but should be defined only in accordance with the following claims and their equivalents.

What is claimed is:

1. A system comprising:
  a memory; and
  at least one processor coupled to the memory and configured to:
    output a digital image to a viewing pane of a display;
    provide a scope overlay including a cursor window, a viewing window having a fixed size relative to the display, and a target source size representing a fraction of the digital image to be displayed within the viewing window, wherein the scope overlay is contained within the viewing pane and overlaps the digital image output to the viewing pane;

calibrate the viewing window according to the target source size to generate an image scale factor; and display a portion of the digital image within the viewing window of the scope overlay, wherein the portion of the image corresponds to a position of the cursor window within the viewing pane and is scaled according to the image scale factor, and wherein the image scale factor is decoupled from adjustments to a zoom level of the digital image output to the viewing pane.

2. The system claim 1, the at least one processor further configured to:

correlate a section of the viewing window to the target source size, the section of the viewing window having a display size; and calculate a ratio of the target source size to the display size of the section to generate the image scale factor.

3. The system of claim 1, the at least one processor further configured to:

receive a conversion factor associated with the digital image; and convert the target source size to pixels based on the conversion factor, wherein the target source size is represented by a physical unit of measure.

4. The system of claim 1, wherein the target source size is customizable, and wherein the at least one processor is further configured to recalibrate the viewing window in response to a change in the target source size.

5. The system of claim 1, the at least one processor further configured to:

detect movement of the cursor window; and update the portion of the digital image displayed within the viewing window in response to detecting the movement of the cursor window.

6. The system of claim 1, the at least one processor further configured to:

annotate the displayed digital image at the position of the cursor window in response to user input.

7. The system of claim 1, wherein the target source size includes a target width and a target height, and wherein the at least one processor is further configured to display a measurement guide superimposed within the viewing window of the scope overlay, wherein the measurement guide corresponds to the target width and the target height.

8. The system of claim 7, wherein the target source size further includes a target depth, and wherein the measurement guide further corresponds to the target depth.

9. The system of claim 8, the at least one processor further configured to:

receive a perspective angle corresponding to the digital image, wherein the measurement guide is oriented according to the perspective angle.

10. A method comprising:

outputting a digital image to a viewing pane of a display;

providing a scope overlay including a cursor window, a viewing window having a fixed size relative to the display, and a target source size representing a fraction of the digital image to be displayed within the viewing window, wherein the scope overlay is contained within the viewing pane and overlaps the digital image output to the viewing pane;

calibrating the viewing window according to the target source size to generate an image scale factor; and displaying a portion of the digital image within the viewing window of the scope overlay, wherein the portion of the image corresponds to a position of the cursor window within the viewing pane and is scaled according to the image scale factor, and wherein the image scale factor is decoupled from adjustments to a zoom level of the digital image output to the viewing pane.

11. The method claim 10, the calibrating further comprising:

correlating a section of the viewing window to the target source size, the section of the viewing window having a display size; and calculating a ratio of the target source size to the display size of the section to generate the image scale factor.

12. The method of claim 10, further comprising:

receiving a conversion factor associated with the digital image; and converting the target source size to pixels based on the conversion factor, wherein the target source size is represented by a physical unit of measure.

13. The method of claim 10, wherein the target source size is customizable, and wherein the method further comprises:

recalibrating the viewing window in response to a change in the target source size.

14. The method of claim 10, further comprising:

detecting movement of the cursor window; and updating the portion of the digital image displayed within the viewing window in response to detecting the movement of the cursor window.

15. The method of claim 10, further comprising:

annotating the displayed digital image at the position of the cursor window in response to user input.

16. The method of claim 10, wherein the target source size includes a target width and a target height, and wherein the method further comprises:

displaying a measurement guide superimposed within the viewing window of the scope overlay, wherein the measurement guide corresponds to the target width and the target height.

17. The method of claim 16, wherein the target source size further includes a target depth, and wherein the measurement guide further corresponds to the target depth.

18. The method of claim 17, further comprising:

receiving a perspective angle corresponding to the digital image, wherein the measurement guide is oriented according to the perspective angle.

19. A non-transitory computer-readable storage device having instructions stored thereon that, when executed by at least one computing device, causes the at least one computing device to perform operations comprising:

outputting a digital image to a viewing pane of a display;

providing a scope overlay including a cursor window, a viewing window having a fixed size relative to the display, and a target source size representing a fraction of the digital image to be displayed within the viewing window, wherein the scope overlay is contained within the viewing pane and overlaps the digital image output to the viewing pane;

calibrating the viewing window according to the target source size to generate an image scale factor; and displaying a portion of the digital image within the viewing window of the scope overlay, wherein the portion of the image corresponds to the position of a cursor window within the viewing pane and is scaled according to the image scale factor, and wherein the image scale factor is decoupled from adjustments to a zoom level of the digital image output to the viewing pane.

20. The non-transitory computer-readable storage device of claim 19, the operations further comprising:
detecting movement of the cursor window; and
updating the portion of the digital image displayed within the viewing window in response to detecting the movement of the cursor window.

\* \* \* \* \*